INVENTORS:
MARSHALL C. KIDD &
ALAN G. ATWOOD
BY John V. Regan
Attorney

INVENTORS
MARSHALL C. KIDD &
ALAN G. ATWOOD
BY
John V. Regan
Attorney 3,305,838

BALANCED MODULATOR SWITCHING SYSTEMS

Marshall C. Kidd, Wayland, and Alan G. Atwood, Chelmsford, Mass., assignors to Radio Corporation of America, a corporation of Delaware Filed Aug. 14, 1963, Ser. No. 302,172
7 Claims. (Cl. 340—166)

This invention relates to switching systems, and more particularly to magnetic switching systems.

In some control systems, an operation or process is monitored at a large number of locations by providing a sensor at each location to generate continuous signals relating to the status of the operation or process. The generated signals are then multiplexed onto a single line for transmission to a central point. The signals generated by the sensors which may, for example, comprise transducers such as thermocouples, strain gauges, or the like, may be slowly varying direct current signals of extremely low power levels, on the order of small fractions of a watt. Such low level signals generally do not have sufficient power to drive multiplex switching devices and consequently heretofore each signal was separately amplified before multiplexing. Furthermore, separate feedback arrangements often are required in such prior art amplifier systems to stabilize low level input signals before they are applied to the multiplexer.

It is an object of this invention to provide a new and improved magnetic switching system for low level signals.

It is another object of this invention to provide a new and improved magnetic switching system which switches low level signals without prior amplification.

It is a further object of this invention to provide a magnetic switching system which both amplifies and multiplexes low level input signals.

It is still a further object of this invention to include the multiplexing elements within the feedback loop of the system.

A magnetic switching system in accordance with the invention includes a plurality of magnetic balanced modulators each of which exhibits two stable saturation states. A first group of modulators are driven to saturation in one state by a series of first excitation signals and a second group of modulators are driven to saturation in the other state by a series of second excitation signals of an opposite phase to the first excitation signals. The excitation signals of the two series are interlaced with each other. A selected modulator, common to both groups, has applied thereto both series of excitation signals which drive this selected modulator alternately between both saturation states. The selected modulator excitation signal then is a suppressed carrier and is amplitude modulated by an input signal applied to the selected modulator to produce when demodulated an output signal which is an amplified replica of the input signal.

In one embodiment of the invention, the plurality of magnetic balanced modulators are arranged in an array of rows and columns to provide a magnetic multiplexer. A separate input signal is individually coupled to each balanced modulator and a single output signal line is serially coupled to all of the balanced modulators. The first excitation signals are coupled to drive a selected one row of balanced modulators to saturation in one state. The second excitation signals are coupled to drive a selected one column of balanced modulators to saturation in the other state. The balanced modulator at the intersection of the selected row and column is driven alternately between both saturation states to produce an output signal in the common output signal line which is modulated by the input signal. The separate input signals are switched to the common output line in any desired order by ordering the selection of the respective rows and columns of the modulators.

The modulated output signal on the common line is demodulated by a phase sensitive detector and amplified to provide an amplified replica of the input signal. Thus, the plurality of input signals are individually both amplified and multiplexed in the magnetic switching system.

In accordance with a feature of the invention, the amplified output signal is fed back to the serially coupled output signal line to provide negative feedback for stabilizing the gain, and for increasing the linearity and stability of the magnetic multiplexer.

In accordance with another feature of the invention, the magnetic switching system is utilized as a distributor rather than as a multiplexer. In distributor operation, the common signal line serially coupled to all of the balanced modulators comprises the input signal line while the individual signal lines for each modulator comprise the separate output signal lines. Signals applied to the common signal line are distributed through the balanced modulators in the array by selectively coupling the first and second excitation means to the respective rows and columns to provide a distributed output.

Figure 1:
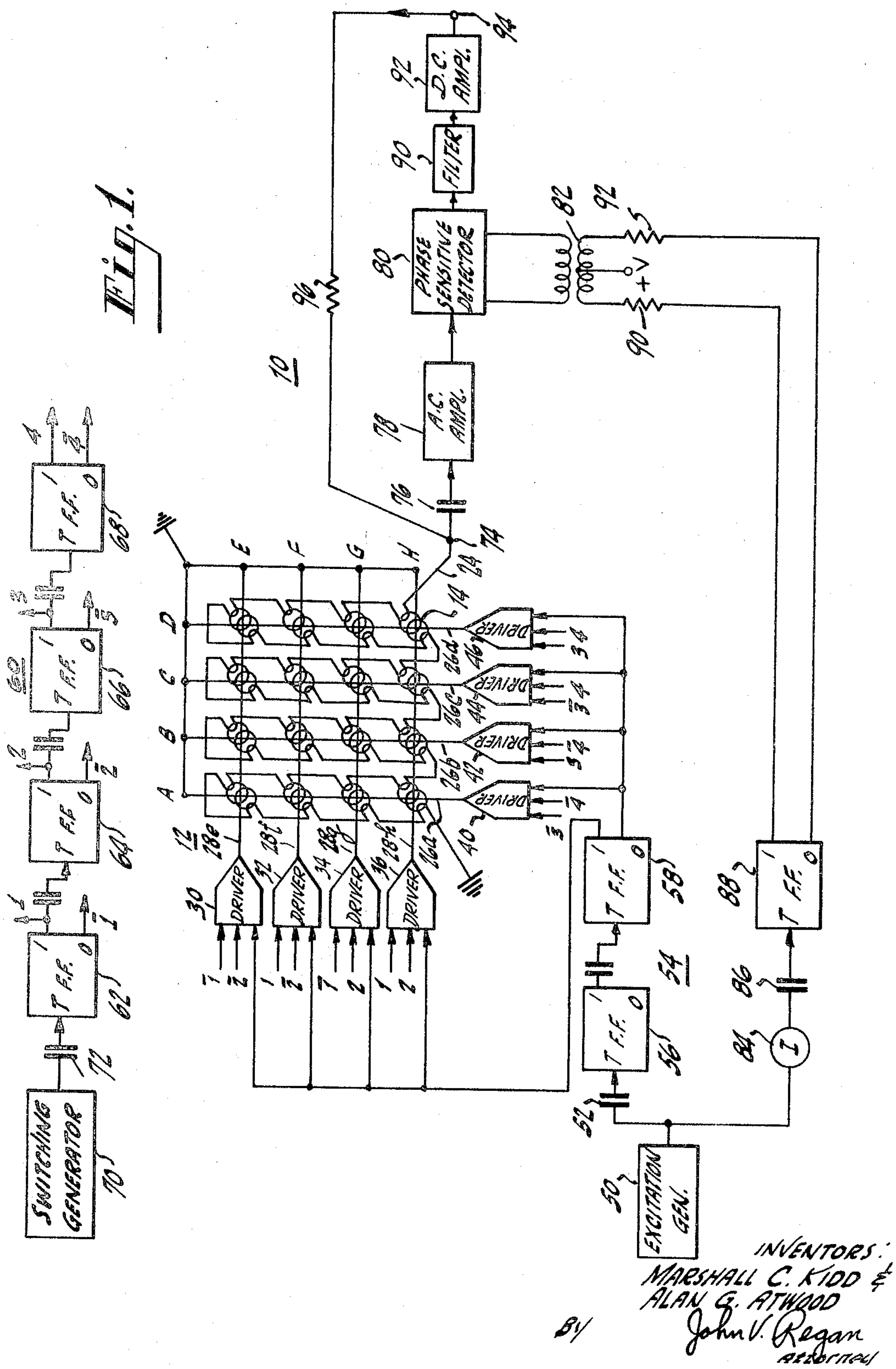
FIGURE 1 is a schematic circuit diagram of a magnetic balanced modulator multiplexer system in accordance with the invention.

Referring now to FIGURE 1, a magnetic balanced modulator switching system 10 includes an array 12 of magnetic balanced modulators 14 arranged in rows and columns. For convenience, the array 12 in FIGURE 1 is shown as a two-dimensional 4 x 4 matix although other array configurations could be utilized. The columns of balanced modulators 14 are lettered consecutively from A through D, while the rows are lettered consecutively from E through H.

Figure 2:
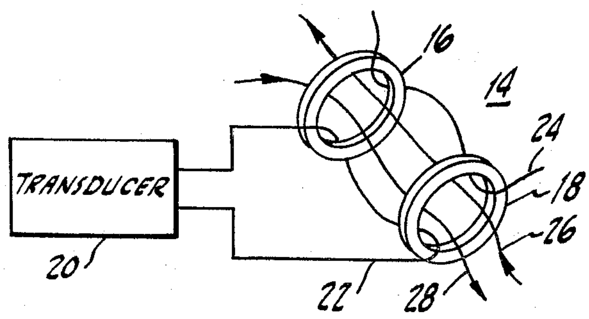
FIGURE 2 is a perspective view of a single balanced modulator with the various couplings thereto.
Figure 3:
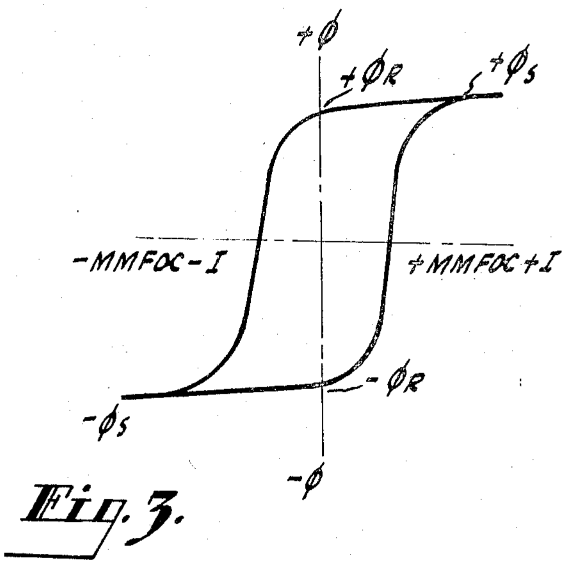
FIGURE 3 represents a hysteresis characteristic of a magnetic element utilized in a balanced modulator; and, FIGURE 4 is a simplified schematic diagram useful for illustrating another embodiment of the invention.

Magnetic balanced modulators have been described in an article by F. C. Williams et al. appearing in the Proceedings, Institution of Electrical Engineers, pages 445–459, volume 97, Part 2, 1950. An individual magnetic balanced modulator 14 used in the present invention is shown in FIGURE 2. The modulator 14 includes a pair of magnetic elements 16 and 18 which may, for example, comprise ferrite cores, permalloy magnetic tape cores, or the like. The magnetic elements 16 and 18 are selected to exhibit substantially similar square loop hysteresis characteristics, similar to that shown in FIGURE 3. First and second excitation windings 28 and 26 are wound on the elements 16 and 18 in a given sense. An input signal for the balanced modulator 14 may be derived from a transducer 20 (FIGURE 2) which is coupled to the modulator 14 by means of an input signal winding 22. The input signal winding 22 is wound on the magnetic elements 16 and 18 in a sense opposite to the excitation windings. An output signal winding 24 is wound on the elements 16 and 18 in a manner similar to the input signal winding 22.

In prior art balanced modulators, only one excitation winding, such as the winding 28, is included in the modulator and an alternating excitation signal of a magnitude sufficient to drive both magnetic elements 16 and 18 alternately between their saturation state $+\phi s$ and $-\phi s$ (FIGURE 3) is applied to this excitation winding. In the absence of an input signal applied to the input signal line 22, each nonlinear magnetic element 16 and 18 induces voltages in the output winding 24 having frequencies equal to the funndamental frequency of the excitation signal and odd harmonics thereof. No even harmonic signals are produced since the elements 16 and 18 exhibit hysteresis loops which are symmetrical about their origin. No output signal is derived from the modulator 14 because the output winding 24 is wound in a series-opposing sense on the elements 16 and 18 and the induced voltages, which are equal and opposite, cancel each other. When a D.C. input signal is applied to the input winding 22, the axis of symmetry of the hysteresis loop of each element is shifted and even harmonics of the excitation signal are produced. The even harmonic voltages produced by each element 16 and 18 are no longer equal and do not cancel in the output winding 24 since the elements 16 and 18 are biased in opposite directions by the input signal. The amplitude of the even harmonic signals generated is proportional to the input signal; hence the output signal is modulated by the input signal. Any even harmonic output signal can be selected as the input signal carrier, but because of its greater strength the second harmonic of the fundamental excitation signal is generally chosen.

The balanced modulator 14 according to the invention includes a second excitation winding 26. One polarity excitation pulses are applied to the first excitation winding 28 and the opposite polarity pulses are applied to the second excitation winding 26 with the winding 26 pulses being displaced in time, i.e., interlaced, with respect to the winding 28 pulses. Thus, the applied excitation pulses are interlaced on the windings 28 and 26 to provide an effective A.C. excitation and the balanced modulator 14 produces an output signal. If pulses are applied to only one of the excitation windings, substantially no output is produced since these single polarity winding pulses drive the magnetic elements to saturation in only one direction.

Referring back to FIGURE 1, each balanced modulator 14 in the array 12 is coupled to a separate input signal source by a separate input winding (not shown) in the same manner in which the modulator 14 is coupled to the transducer 20 by the input winding 22 in FIGURE 2. It is to be noted that neither side of the transducer 20 in FIGURE 2 is grounded. Such a floating input avoids spurious noise generation which may tend to override low level input signals. The input impedance of the balanced modulator 14 is matched to the impedance of the transducer 20 by using an appropriate number of turns. In the case of a low impendance transducer, a large number of turns (say 200 or more) is used in the input signal line 22. Such a large number of turns also increases the sensitivity of the balanced modulators 14.

An addressing system for the switching system 10 includes a plurality of gated row drivers 30, 32, 34 and 36, and gated column drivers 40, 42, 44 and 46. The driver 30 is coupled to row E of balanced modulators 14 by an excitation winding 28*e*, serially coupled to each modulator in the same manner as the excitation winding 28 in FIGURE 2. The drivers 32, 34 and 36 are similarly coupled to the rows F, G and H, respectively, by excitation windings 28*f*, 28*g* and28*h*. The driver 40 is coupled to the column A of the balanced modulators 14 by an excitation winding 26*a* serially coupled to each modulator in the same manner as the excitation winding 26 in FIGURE 2. The drivers 42, 44 and 46 are similarly coupled to the columns B, C and D, respectively, by the excitation windings 26*b*, 26*c* and 26*d*. The column and row excitation windings are all connected to a common potential point or ground after being threaded through the balanced modulators 14. The column and row drivers may each, for example, comprise a three input coincidence or AND gate.

Each of the column 40–46 and row 30–36 drivers have applied therto excitation signals derived from an excitation signal generator 50. The excitation generator 50 may comprise a squarewave oscillator which oscillates at a predetermined frequency of, for example, 600 kc. and includes an adjustment for the trailing edges of the pulses generated to provide a phase adjustment. The output of the excitation generator 34 is coupled through a capacitor 52 to a frequency divider 54 comprising a pair of serially connected flip-flops 56 and 58. Each flip-flop includes a trigger input terminal (T) and a pair of output terminals labelel "1" and "0", and corresponding respectively to the set and reset stable operating states of the flip-flops. Each flip-flop is triggered from one stable state to the other by the negative-going edge of an input pulse applied to the trigger input terminal T and produces outputs from the "1" and "0" output terminals which are 180° out of phase with each other. The flip-flops 56 and 58 each divide the frequency of the excitation generator 50 by two to provide excitation drive signals for the balanced modulators 14 that have a frequency one-quarter of that of the frequency of the generator 50 or 150 kc. The "1" output terminal of the flip-flop 58 is coupled to each of the row drivers 30 through 36, while the "0" output terminal is coupled to each of the column drivers 40 through 46 so that oppositely phased signals are applied thereto.

The row and column addressing signals for the multiplexer 10 are supplied by a four-stage address register 60 including the four flip-flops 62, 64, 66 and 68. The four flip-flops have sixteen ($2^4$) discrete combination of "1" and "0" signals to identify the sixteen modulators. It is understood that any other suitable addressing arrangement may be used to select the modulators. A switching generator 70, which may comprise a squarewave oscillator having a frequency on the order of 500 cycles per second, is coupled to the first flip-flop 62 in the address register 60 through a capacitor 72. The "1" output terminal of each of the flip-flops is capacitively coupled to the trigger input terminal (T) of the succeeding flip-flop. Each flip-flop in the register 60 includes a pair of complementary outputs from the "1" and "0" output terminals thereof and these are legended, respectively, 1, $\bar{1}$; 2, $\bar{2}$; etc. for the successive flip-flops. One of the output terminals from each of the first two flip-flops 62 and 64 are coupled to the row drivers 30, 32, 34 and 36 to gate these drivers open sequentially. Similarly, one of the output terminals from each of the last two flip-flops 66 and 68 is coupled to the column drivers 40, 42, 44 and 46 to gate these drivers open sequentially. Thus, the sixteen balanced modulators in the array 12 will be addressed sequentially by the switching generator 70. The balanced modulators 14 in the array 12 could be randomly addressed if desired by using a parallel input register for receiving the binary code number designating the selected modulator and connecting the register outputs to the driver gates.

The multiplexer 10 also includes output signal means such as the output signal line 24 which is serially coupled to all of the balanced modulators 14 in the matrix in a manner identical to the winding 24 in FIGURE 2. One side of the output line 24 is connected to circuit ground and the other side is connected to a terminal 74. The terminal 74 is connected through a capacitor 76 to an A.C. amplifier 78. The A.C. amplifier 78 is tuned to the second harmonic of the fundamental frequency of the excitation signals applied to the array 12 by the flip-flop 58 in the frequency divider 54, i.e., tuned to 300 kc. in the assumed example. The amplifier 78 is coupled to a phase sensitive detector 80 which may, for example, comprise a rectifier bridge or ring demodulator. A reference signal of the same frequency as the second harmonic output of the balanced modulators 14, or 300 kc., is applied to the detector 80 by the secondary winding of a transformer 82 having a center-tapped primary connected to a positive potential source +V. The reference signal is derived from the excitation generator 50 by inverting the output thereof by means of an inverter 84 and applying the inverted signal through a capacitor 86 to a frequency dividing flip-flop 88. The flip-flop 88 triggers on the negative-going edge of the inverted signal and divides the 600 kc. signal from the generator 50 by two to obtain the 300 kc. reference signal. Both the "1" and "0" output terminals of the flip-flop 88 are coupled through the resistors 90 and 92, respectively, to opposite terminals of the primary of the transformer 82.

The demodulated output of the detector 80 is coupled through a low-pass filter 90 to a D.C. amplifier 92. The D.C. output of the amplifier 92 is derived from a terminal 94 which comprises the output terminal for the multiplexer 10. The D.C. output is also fed back through a feedback resistor 96 to the terminal 74 of the output signal line 24 to provide negative D.C. feedback for each of the balanced modulators 14 in the array 12. The feedback path includes the resistor 96, the common output winding 24, circuit ground back to the amplifier 92. It should be noted here that the same feedback path is used for all the signal inputs and the modulators serve in both the multiplexing and feedback functions.

In operation, separate input signals are applied to each balanced modulator 14 by means of their individual input signal windings 22. Excitation pulses of one phase are applied to all of the row drivers 30–36 from the "1" output terminal of the flip-flop 58, and a short time thereafter (1/150 millisecond) excitation pulses are applied to all of the column drivers 40–46 from the "0" output terminal of the flip-flop 58. The address register 60 enables one row driver and one column driver simultaneously. Assuming the flip-flops in the register 60 are all in the reset state initially, the trailing edge of the first pulse from the switching generator 70 sets the first flip-flop 62. This activates the row driver 32, while the column driver 40 is also activated by the reset states of the flip-flops 66 and 68 in the address register 60. Thus, first excitation pulses are applied to all of the modulators in row F of the array 12 and the current through the excitation winding **28*f* is in the same direction as the arrowheads on the winding 28 in FIGURE 2. Thus, all of the modulators in row F of the array 12 are driven to saturation in one direction such as $+\phi s$ in FIGURE 3. After each of these row pulses the flux level in the modulators in row F return to the remanent level $+\phi r$ in FIGURE 2. The second excitation pulses are next applied to all of the modulators in column A of the array 12 and the current through the excitation winding 26*a* is in the same direction as the arrowheads on the winding 26 in FIGURE 2. Since this direction is opposite to that in the winding 28**, the modulators in column A are driven to saturation in the other direction, such as $-\phi s$ in FIGURE 3. After each of these column pulses the modulators in column A return to the remanent level $-\phi r$.

The modulator (AF) which is common to both row F and column A has applied thereto both the first and second excitation pulses. These pulses are interlaced with each other and apply successive opposite polarity magnetizing forces to the modulator AF. Hence the modulator AF effectively receives an alternating signal excitation and is driven alternately to positive and negative saturation at the switching frequency of the flip-flop 58. Thus, this common modulator (AF) is the only one in the array 12 which is A.C. excited and consequently functions as a balanced modulator.

The common balanced modulator (AF) produces in the output signal line 24 an A.C. output signal which is the second harmonic of the excitation signal frequency and which is amplitude modulated by the D.C. input signal applied to the signal input line 22 of this modulator. It is to be noted that the output signal line 24 is isolated from the input signal line 22 because they operate at different frequencies. The modulated output signal is A.C. coupled through the capacitor 76 to be amplified by the A.C. amplifier 78. The amplified second harmonic output signal is applied to the detector 80, along with the second harmonic reference signal. The detector 80 preserves the correct polarity of the input signal while rectifying, or demodulating, the second harmonic output signal to produce an amplified replica of the input signal. The excitation generator 50 may be adjusted to insure that the reference signal and the second harmonic modulated signal are either in phase or 180° out of phase when applied to the detector 80. The detected signal is filtered in the filter 90 and amplified by the D.C. amplifier 92 to provide an output signal at the output terminal 94, which signal may be applied to an output circuit for further processing.

The output signal is also fed back through the feedback resistor 96 to the output signal line 24 in the matrix 12 to provide negative D.C. feedback to stabilize the gain of the common modulator. This manner of feeding back the output signal, without the incorporation of a separate feedback winding on the modulators, reduces the number of windings on the magnetic elements. The feedback also effectively incorporates every modulator in the array 12 in the feedback loop and stabilizes the gain of the modulator-amplifier combination for many input signals. The negative feedback improves the linearity of the output signal with respect to the input signal and also increases the stability of the modulators.

The magnetic switching system 10 is high speed since the excitation signals are switched rather than the input signals. Thus, high speed switching of low level signals is attained. The magnetic modulators function as both switches and modulators with gain.

An aspect of the invention is that the switching system may also be used as a distributor to distribute a single input signal to many output circuits. In such operation, the signal line 24 in FIGURE 1 is utilized as the single input signal line by disconnecting the line from the terminal 74 and applying input signals to the line 24. A separate A.C. amplifier 78, detector 80, filter 90, and D.C. amplifier 92 are coupled in a series string to each signal line 22 (FIGURE 2) of the modulators 14, which signal lines 22 comprise the plurality of output signal lines. A single excitation system, reference signal system, and address system identical to that shown in FIGURE 1 is utilized for distributor operation of the magnetic switching system with the exception that the transformer 82 requires a plurality of secondary windings, one for each phase sensitive detector.

Another aspect of the invention is that the magnetic switching system 10 may be utilized to provide different gains for different input signals, or different gains for the same input signals, or both. The gain of the system 10 in FIGURE 1 is given by the equation:

$$\text{Gain} = (R_F T_{IN}) T_F \tag{1}$$

where $R_F$=resistance of feedback resistor 96
$T_{IN}$=number of turns on input winding 22
$T_F$=number of turns on feedback winding (output winding 24)

Thus, by varying the number of turns on the input windings 22 on different balanced modulators in FIGURE 1, the input signals to these modulators will be amplified by different amounts.

Figure 4:
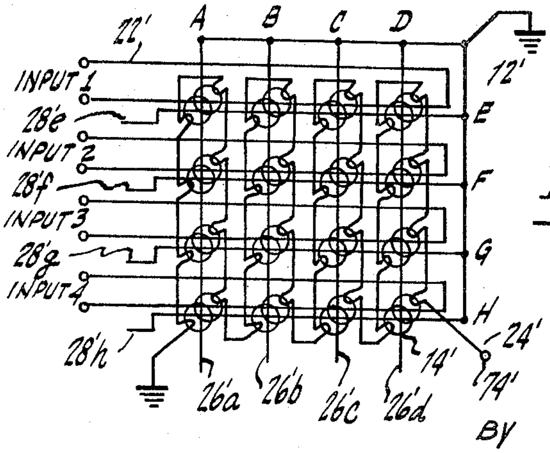

The same input signal may be coupled to a plurality of modulators with the input signal line having a different number of turns on each modulator to provide different gains for the same input signal. Thus, in the magnetic modulator array 12' of FIGURE 4, the input line 22', for input "1," is serially linked to each magnetic modulator 14' in row E but a different number of turns is utilized for each modulator in the row. For example, the number of turns for the modulators AE, BE, CE and DE may be 10, 20, 50 and 100, respectively. The remaining input signals may be similarly coupled to rows F, G and H of the array 12'. The other structure for the system 10' may be identical to that shown in FIGURE 1.

The gains exhibited for input signal "1" when the modulators AE, BE, CE and DE are selectively excited are respectively 100, 200, 500 and 1000 for a feedback resistor 96' (not shown) having a resistance value of 100 ohms and a feedback winding (the output line 24') linked to each modulator by 10 turns. Only the excited modulator in the row serially linked by the input line 22' provides gain since the non-excited modulators in the row function as passive inductances.

It is apparent from Equation 1 that the number of turns linking the feedback or output winding 24' to each modulator may also be varied to change the gain which offers great flexibility in attaining desired gains. Thus, variable and programmable gain is provided by this aspect of the invention.

What is claimed is:

1. A switching system comprising in combination,
first and second groups of magnetic balanced modulators, each modulator of which exhibits a pair of stable saturation states,
a single signal line serially coupled to said first and second groups of modulators,
a plurality of signal lines coupled separately to each of said balanced modulators,
first excitation means coupled to drive said first group of modulators to saturation in one of said stable states by a series of first excitation signals,
second excitation means coupled to drive said second group of modulators to saturation in the other stable state by a series of second excitation signals interlaced with said first excitation signals so that a balanced modulator common to both of said groups is driven to saturation alternately in both of said stable states by said first and second excitation signals,
means for applying input signals to one or the other of said single signal line and plurality of signal lines, and
means for deriving an output signal from the other of said single signal line and plurality of signal lines.

2. An electrical circuit comprising in combination,
first and second groups of magnetic balanced modulators, each modulator of which exhibits a pair of stable saturation states,
first and second excitation means coupled, respectively, to drive said first group of modulators to saturation in one of said stable states and said second group of modulators to saturation in the other state so that a balanced modulator common to both of said groups is driven to saturation alternately between both of said stable states.

3. A multiplexer comprising in combination,
first and second groups of magnetic balanced modulators, each modulator of which exhibits a pair of stable saturation states,
means for coupling a separate input signal to each of said balanced modulators,
first excitation means coupled to drive said first group of modulators to saturation in one of said stable states by a series of first excitation signals,
second excitation means coupled to drive said second group of modulators to saturation in the other stable state by a series of second excitation signals interlaced with said first excitation signals so that a balanced modulator common to both of said groups is driven to saturation alternately in both of said stable states, and
signal output means coupled in common to all of said balanced modulators to drive from said selected balanced modulator an output signal modulated by said input signal.

4. A device for transferring input signals from one transmission circuit to another comprising in combination, a pair of magnetic elements exhibiting two stable saturation states,
an input signal winding wound in an opposite sense on both of said magnetic elements for receiving said input signals,
an output signal winding wound in the same sense as said input signal winding on both of said magnetic elements,
a first excitation winding wound on both of said elements in a manner to drive both to saturation in one stable state when excited,
a second excitation winding wound on both of said elements in a manner to drive both to saturation in the other stable state when excited, and
means for alternately pulsing said first and second excitation windings to drive said pair of magnetic elements alternately from one stable state to the other so that an output signal modulated by said received input signals is produced in said output winding.

5. A switching system comprising in combination,
a plurality of balanced modulators arranged in an array of rows and columns with each modulator exhibiting two stable saturation states,
means for coupling a separate input signal to each of said balanced modulators,
signal output means coupled in common to all of said balanced modulators,
a plurality of row drivers coupled individually to each of said rows to selectively drive each row of modulators to saturation in one stable state with a series of first excitation signals, and
a plurality of column drivers coupled individually to each of said columns to selectively drive each column of modulators to saturation in the other stable state with a series of second excitation signals interlaced with said first excitation signals,
the balanced modulator at the coordinate intersection of said row and column drivers being driven alternately between both of said stable saturation states to produce an output signal modulated by said input signal.

6. A balanced modulator comprising in combination,
a pair of magnetic elements exhibiting two stable saturation states,
an input signal winding wound in an opposite sense on both of said magnetic elements to apply an input signal to said balanced modulator,
an output signal winding wound on both of said magnetic elements in the same sense as said input signal winding,
alternating signal excitation means wound on both magnetic elements in a manner to drive both to saturation alternately between both of said stable states to produce an output signal in said output signal winding which is modulated by said input signal,
a demodulator coupled to said output signal winding to demodulate said output signal, and
means for feeding back said demodulated output signal to said output signal winding to provide feedback for stabilizing said balanced modulator.

7. A switching system comprising in combination,
a plurality of balanced modulators arranged in an array of rows and columns with each modulator exhibiting two stable saturation states,
means for coupling a separate input signal to each of said balanced modulators,
signal output means coupled in common to all of said balanced modulators,
a plurality of row drivers coupled individually to each of said rows to selectively drive each row of modulators to saturation in one stable state with a series of first excitation signals, a plurality of column drivers coupled individually to each of said columns to selectively drive each column of modulators to saturation in the other stable state with a series of second excitation signals interlaced with said first excitation signals, the balanced modulator at the coordinate intersection of said row and column drivers being driven alternately between both of said stable saturation states to produce in said signal output means an output signal modulated by said input signal, a demodulator coupled to said signal output means to demodulate said output signal, and means for feeding back said demodulated output signal to said signal output means to provide feedback for stabilizing all of said balanced modulators.

No references cited.

NEIL C. READ, *Primary Examiner.*

H. PITTS, *Assistant Examiner.*